(12) United States Patent
Yang et al.

(10) Patent No.: US 11,288,371 B2
(45) Date of Patent: Mar. 29, 2022

(54) BLOCKCHAIN-BASED DATA PROCESSING METHOD, APPARATUS, AND DEVICE

(71) Applicant: Alipay (Hangzhou) Information Technology Co., Ltd., Zhejiang (CN)

(72) Inventors: Wenyu Yang, Zhejiang (CN); Honglin Qiu, Zhejiang (CN); Ying Yan, Zhejiang (CN); Shubo Li, Zhejiang (CN); Hanghang Wu, Zhejiang (CN); Yuan Chen, Zhejiang (CN); Renhui Yang, Zhejiang (CN); Qin Liu, Zhejiang (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 17/358,479

(22) Filed: Jun. 25, 2021

(65) Prior Publication Data
US 2022/0035922 A1    Feb. 3, 2022

(30) Foreign Application Priority Data
Jul. 31, 2020 (CN) .......................... 202010757355.0

(51) Int. Cl.
*G06F 21/57*    (2013.01)
*G06F 16/23*    (2019.01)
(Continued)

(52) U.S. Cl.
CPC .......... *G06F 21/57* (2013.01); *G06F 16/2379* (2019.01); *G06F 21/64* (2013.01); *H04L 9/0618* (2013.01); *G06F 2221/2149* (2013.01)

(58) Field of Classification Search
CPC ...... G06F 21/57; G06F 16/2379; G06F 21/64; G06F 2221/2149; H04L 9/0618
See application file for complete search history.

(56) References Cited

U.S. PATENT DOCUMENTS 10,505,949 B2 * 12/2019 Zhang ................ G06Q 30/0601
10,742,393 B2 *  8/2020 Wooden ................ H04L 9/3236
(Continued)

FOREIGN PATENT DOCUMENTS

CN        111090876 A     5/2020
CN        111143890 A     5/2020
WO    WO 2018179293 A1    10/2018

OTHER PUBLICATIONS

Extended European Search Report in European Application No. 21181318.3, dated Dec. 17, 2021.

*Primary Examiner* — Beemnet W Dada
(74) *Attorney, Agent, or Firm* — Finnegan, Henderson, Farabow, Garrett & Dunner, LLP

(57) ABSTRACT

A blockchain-based data processing method is applied to a terminal device provided with a trusted execution environment, and includes: acquiring a data upload request of a user, the data upload request including to-be-uploaded data to be uploaded to a blockchain; transferring, through a first trusted application for performing data upload processing on the terminal device, the to-be-uploaded data in the data upload request to the trusted execution environment of the terminal device, wherein the trusted execution environment is provided with a verification rule for performing data verification on the to-be-uploaded data of the first trusted application; determining, by using the trusted execution environment, whether the to-be-uploaded data complies with the verification rule; and if it is determined that the to-be-uploaded data complies with the verification rule, acquiring verified to-be-uploaded data from the trusted execution environment based on the first trusted application, and uploading the verified to-be-uploaded data.

17 Claims, 6 Drawing Sheets

(51) Int. Cl.
 *H04L 9/06* (2006.01)
 *G06F 21/64* (2013.01)

(56) References Cited

U.S. PATENT DOCUMENTS

| | | | |
|---|---|---|---|
| 10,805,089 B1* | 10/2020 | Yu | H04L 9/30 |
| 2018/0183586 A1* | 6/2018 | Bhargav-Spantzel | G06F 21/33 |
| 2020/0036533 A1* | 1/2020 | Soundararajan | H04L 9/3247 |
| 2020/0304319 A1* | 9/2020 | Wei | H04L 9/321 |
| 2020/0322153 A1* | 10/2020 | Cai | H04W 12/104 |
| 2021/0150065 A1* | 5/2021 | Qiu | H04L 9/3239 |
| 2021/0326476 A1* | 10/2021 | Su | G06F 21/57 |

* cited by examiner

BLOCKCHAIN-BASED DATA PROCESSING METHOD, APPARATUS, AND DEVICE

CROSS-REFERENCE TO RELATED APPLICATIONS

The present application is based upon and claims priority to Chinese Patent Application No. 202010757355.0, filed on Jul. 31, 2020, the entire content of which is incorporated herein by reference.

TECHNICAL FIELD

The present specification relates to the field of computer technologies, and in particular, to a blockchain-based data processing method, apparatus, and device.

BACKGROUND

Blockchains have been well applied to anti-tampering, anti-counterfeiting, and traceability of online data. If relevant data in a certain service (such as a payment service, a logistics service, and a fundraising and funding service) is added to a blockchain, the data cannot be changed and repudiated.

Generally, a user may upload data to a blockchain, and the blockchain may verify the data. After the verification is passed, the data may be stored in the blockchain. However, in a process of the user transmitting or transferring to-be-uploaded data to be uploaded to the blockchain to a blockchain node, how to ensure the authenticity and accuracy of the data in the process of transmission or transferring and to prevent the data from being tampered with in the process of transmission or transferring has become an important problem to be solved. Therefore, there is a need to provide a technical solution capable of ensuring the security and accuracy of data in the process of uploading the data to a blockchain.

SUMMARY

According to a first aspect of embodiments of the present specification, a blockchain-based data processing method is applied to a terminal device provided with a trusted execution environment and includes: acquiring a data upload request of a user, the data upload request including to-be-uploaded data to be uploaded to a blockchain; transferring, through a first trusted application for performing data upload processing on the terminal device, the to-be-uploaded data in the data upload request to the trusted execution environment of the terminal device, wherein the trusted execution environment is provided with a verification rule for performing data verification on the to-be-uploaded data of the first trusted application; determining, by using the trusted execution environment, whether the to-be-uploaded data complies with the verification rule; and if it is determined that the to-be-uploaded data complies with the verification rule, acquiring verified to-be-uploaded data from the trusted execution environment based on the first trusted application, and uploading the verified to-be-uploaded data.

According to a second aspect of embodiments of the present specification, a blockchain-based data processing device is provided with a trusted execution environment and includes: a processor; and a memory storing instructions executable by the processor, wherein the processor is configured to: acquire a data upload request of a user, the data upload request including to-be-uploaded data to be uploaded to a blockchain; transfer, through a first trusted application for performing data upload processing on the device, the to-be-uploaded data in the data upload request to the trusted execution environment of the device, wherein the trusted execution environment is provided with a verification rule for performing data verification on the to-be-uploaded data of the first trusted application; determine, by using the trusted execution environment, whether the to-be-uploaded data complies with the verification rule; and if it is determined that the to-be-uploaded data complies with the verification rule, acquire verified to-be-uploaded data from the trusted execution environment based on the first trusted application, and upload the verified to-be-uploaded data.

According to a third aspect of embodiments of the present specification, a non-transitory computer-readable storage medium has stored therein instructions that, when executed by a processor of a terminal device, cause the terminal device to perform a blockchain-based data processing method, the terminal device being provided with a trusted execution environment, the method including: acquiring a data upload request of a user, the data upload request including to-be-uploaded data to be uploaded to a blockchain; transferring, through a first trusted application for performing data upload processing on the terminal device, the to-be-uploaded data in the data upload request to the trusted execution environment of the terminal device, wherein the trusted execution environment is provided with a verification rule for performing data verification on the to-be-uploaded data of the first trusted application; determining, by using the trusted execution environment, whether the to-be-uploaded data complies with the verification rule; and if it is determined that the to-be-uploaded data complies with the verification rule, acquiring verified to-be-uploaded data from the trusted execution environment based on the first trusted application, and uploading the verified to-be-uploaded data.

BRIEF DESCRIPTION OF THE DRAWINGS

The accompanying drawings, which are incorporated in and constitute a part of this specification, illustrate embodiments and, together with the description, serve to explain the principles of the specification.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The described embodiments are merely examples of rather than all the embodiments of the present specification.

Figure 1:
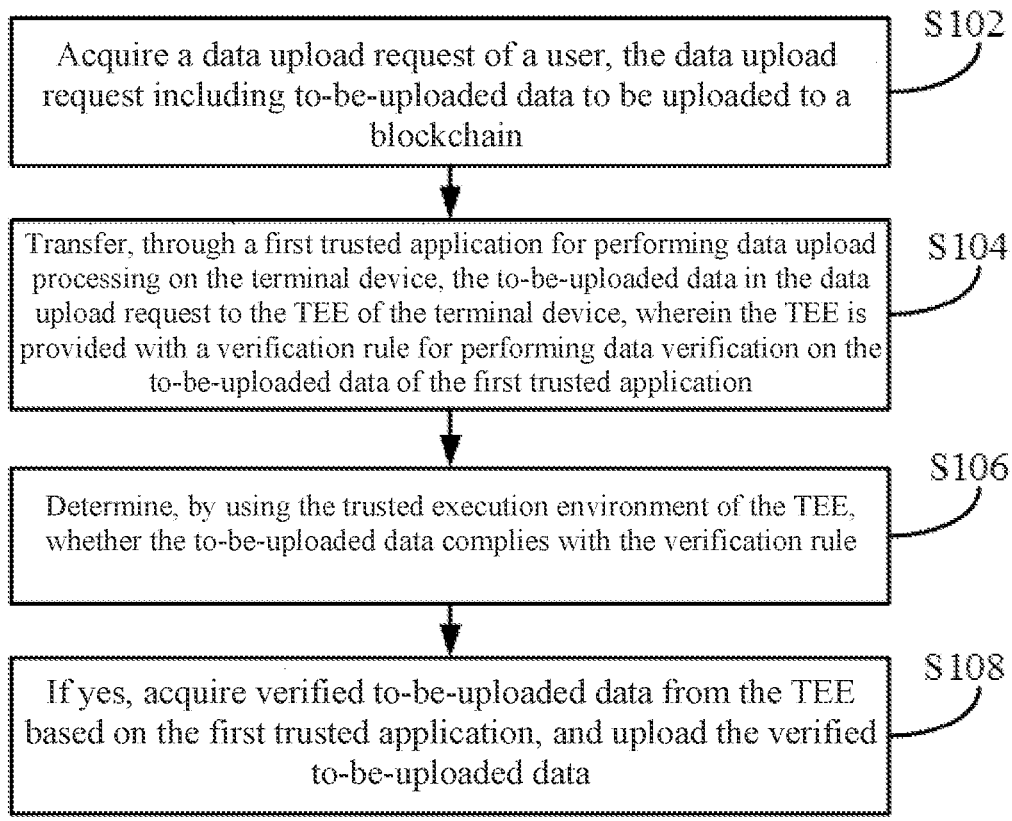
FIG. 1 is a flowchart of a blockchain-based data processing method according to an embodiment.

FIG. 1 is a flowchart of a blockchain-based data processing method according to an embodiment. The method may be performed by a terminal device. The terminal device may be a computer device such as a notebook computer or a desktop computer. The terminal device may be a terminal device configured to verify credibility of the to-be-uploaded data to a blockchain. The terminal device may be provided with a trusted execution environment. The trusted execution environment may be a Trusted Execution Environment (TEE), and the trusted execution environment may be implemented through a program written in a predetermined programming language (that is, it may be implemented in the form of software). The trusted execution environment may be a safe operation environment for data processing. In addition, the method may also be performed by a server or the like. The server may be a stand-alone server or a server cluster composed of a plurality of servers. The server may also be provided with the trusted execution environment TEE. The method being performed by a terminal device is taken as an example in the embodiments of the present specification. In a case where the method is performed by a server, the method may be performed with reference to the following related content. The method may include the following steps:

In step S102, a data upload request of a user is acquired, the data upload request including to-be-uploaded data to be uploaded to a blockchain.

The to-be-uploaded data may be any data, such as transaction data generated by a user in an online transaction process, personal credit data of a user, or related data of a device in the Internet of Things. A blockchain may be a system configured to store data of a certain category or of a plurality of different categories. The data upload request may include to-be-uploaded data to be uploaded to a blockchain, and may also include, for example, an identifier of the to-be-uploaded data, relevant information of a holder of the to-be-uploaded data, relevant information of a user initiating the data upload request, service attribute information of the to-be-uploaded data (such as a service category corresponding to the to-be-uploaded data and a service identifier corresponding to the to-be-uploaded data), and the like, which may be set according to an actual situation and is not limited in the embodiment of the present specification.

In an embodiment, a blockchain has been well applied to anti-tampering, anti-counterfeiting, and traceability of online data. If relevant data in a certain service (such as a payment service, a logistics service, and a fundraising and funding service) is added to a blockchain, the data cannot be changed and repudiated. Generally, a user may upload data to the blockchain, and the blockchain may verify the data. After the verification is passed, the data may be stored in the blockchain. However, in a process of the user transmitting or transferring data needing to be uploaded to the blockchain to a blockchain node, how to ensure the authenticity and accuracy of the data in the process of transmission or transferring and to prevent the data from being tampered with in the process of transmission or transferring has become an important problem to be solved. Therefore, there is a need to provide a technical solution capable of ensuring the security and accuracy of data in the process of uploading the data to a blockchain. The embodiment of the present specification provides a technical solution capable of ensuring the security and accuracy of data in the process of uploading the data to a blockchain.

Figure 2:
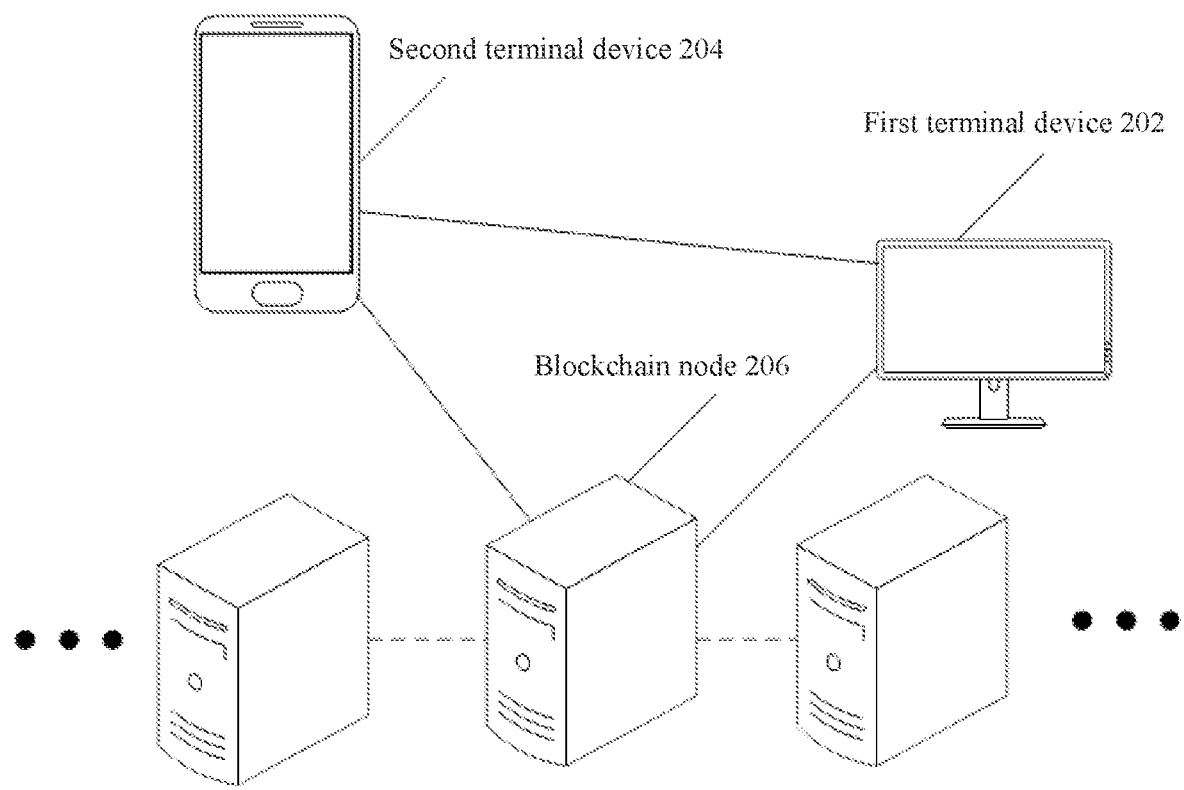
FIG. 2 is a schematic diagram of a blockchain-based data processing system according to an embodiment.

FIG. 2 is a schematic diagram of a blockchain-based data processing system according to an embodiment. As shown in FIG. 2, in order to perform data verification on data to be uploaded to the blockchain (i.e., to-be-uploaded data), a terminal device for performing data verification on the to-be-uploaded data may be preset. In order to be distinguished from a subsequent terminal device of a user, the terminal may be referred to as a first terminal device 202, and the terminal device of the user may be referred to as a second terminal device 204. An application program that performs the above data verification function may be installed in the first terminal device 202. Correspondingly, an application program for uploading data to the blockchain may also be installed in the terminal device of the user (i.e., the second terminal device 204). The user may upload data to the blockchain through the application program. To this end, a data uploading entry, such as a key or a hyperlink for data uploading, may be set in the application program. If the user needs to upload the data to the blockchain (i.e., the to-be-uploaded data), the to-be-uploaded data may be uploaded through the above data uploading entry. For example, the user may click the key or hyperlink for data uploading, and the second terminal device 204 may display a data uploading page. The page may include a data input box and/or a data selection box. The user may input the to-be-uploaded data or select the to-be-uploaded data for uploading. After the uploading is completed, the second terminal device 204 may acquire the to-be-uploaded data, generate a data upload request, and send the upload request to the first terminal device 202, and the first terminal device 202 may acquire the data upload request of the to-be-uploaded data.

In the above embodiment, the second terminal device 204 directly sends a data upload request to the first terminal device 202. In another embodiment, other methods may also be used. For example, the second terminal device 204 may send the data upload request to a blockchain node 206. The blockchain node 206 may send a redirection message to the second terminal device. The redirection message may include an access address (such as an IP address) of the first terminal device 202. The second terminal device 204 may send the upload request to the first terminal device 202 based on the access address in the redirection message, and the first terminal device 202 may acquire the data upload request of the to-be-uploaded data. In another example, the first terminal device 202 and the second terminal device 204 may also be combined into one terminal device. In this case, the user may directly upload the to-be-uploaded data on the terminal device through the above data uploading entry. For example, the user may click the key or hyperlink for data uploading, and the terminal device may display a data uploading page. The page may include a data input box and/or a data selection box. The user may input the to-be-uploaded data or select the to-be-uploaded data for uploading. After the uploading is completed, the terminal device may acquire the to-be-uploaded data, and generate a data upload request. In this case, the terminal device may acquire the data upload request of the user.

In step S104, the to-be-uploaded data in the data upload request is transferred, through a first trusted application for performing data upload processing on the terminal device, to the TEE of the terminal device, wherein the TEE is provided with a verification rule for performing data verification on the to-be-uploaded data of the first trusted application.

The TEE may be a trusted execution environment. The TEE may be implemented through a program written in a predetermined programming language (that is, it may be implemented in the form of software). The trusted execution environment of the TEE may be a data processing environment that is safe and isolated from other environments, that is, processing executed in the trusted execution environment and data generated during data processing may not be accessed by other execution environments or applications outside the trusted execution environment. The trusted execution environment of the TEE may be implemented by creating a small operating system that can run independently in a trusted zone (such as TrustZone), and the TEE may provide a service directly in the form of a system call (such as directly processing by a TrustZone kernel). The terminal device may include a rich execution environment (REE) and a TEE. An operating system installed on the terminal device, such as an Android operating system, an iOS operating system, a Windows operating system, or a Linux operating system, may be run under the REE. The REE may feature powerful functions, openness, and scalability, and may provide upper-level applications with all the functions of the terminal device, such as a camera function and a touch control function. However, there may be security risks in the REE. For example, the operating system may acquire all data of a certain application program, but it is difficult to validate whether the operating system or the application program has been tampered with. If it is tampered with, there may be a great security risk in information of the user. In view of this, the TEE in the terminal device may be required to perform processing. The TEE has its own execution space, that is, there is also an operating system under the TEE. The TEE has a higher security level than the REE. Software and hardware resources in the terminal device that are accessible to the TEE are separated from the REE; however, the TEE may directly acquire information of the REE, while the REE may not acquire information of the TEE. The TEE may perform validation and other processing through a provided interface, so as to ensure that user information (such as payment information and user privacy information) will not be tampered with, passwords will not be hijacked, and fingerprints or faces and other information will not be stolen.

The first trusted application may be a pre-specified trusted application that may be configured to perform data upload processing, such as a financial payment application, an instant messaging application, or a pre-developed application program. The first trusted application may be an application program that needs to be installed in the terminal device, or a code program that is pre-installed in a hardware device of the terminal device, or a program that runs in the background of the operating system of the terminal device in the form of a plug-in, or the like, which may be set according to an actual situation. The verification rule may be a rule capable of performing data verification on the to-be-uploaded data. The verification rule may be set in many different manners. For example, it may be set based on a preset data anti-tampering rule, or set based on an identity of the user uploading the data to the blockchain, and corresponding verification rules may also be set for different service categories to which the to-be-uploaded data belongs. Different verification rules may be set for the to-be-uploaded data of different service categories. For example, a verification rule that meets real-name authentication requirements may be set for a real-name authentication service, a verification rule that meets payment requirements and payment security requirements may be set for a payment service, and the like, which may be set according to an actual situation. Moreover, the verification rule may be set in the TEE of the terminal device in advance. In order to ensure the security of the verification rule, the verification rule may be ciphertext, that is, content of the verification rule may be formulated by an authorized rule maker. Then, the verification rule may be encrypted or signed by the specified encryption or signature method to form the ciphertext of the verification rule. Next, the ciphertext of the verification rule is transferred to the TEE of the terminal device through a specified security data transmission channel, so as to ensure the security of the verification rule and prevent tampering. In a feasible execution environment of the TEE, decryption or signature verification may be performed on the ciphertext of the verification rule. After it is determined that the verification rule is not tampered with (for example, the signature verification is passed or the decryption may be performed, and the decrypted verification rule meets a preset condition, and the like), the verification rule may be stored in the TEE.

In an embodiment, in order to ensure the security in the process of uploading the to-be-uploaded data to the blockchain and prevent the to-be-uploaded data in the data upload request from being acquired by any application program in the REE, a trusted application (that is, the first trusted application) configured to perform data upload processing may be set. The first trusted application temporarily protects the to-be-uploaded data, for example, other unauthorized applications can be prevented from accessing the to-be-uploaded data, thus performing data protection accordingly. In an embodiment, the to-be-uploaded data may be pre-processed to acquire processed to-be-uploaded data, thus performing data protection accordingly. For example, the to-be-uploaded data is encrypted or signed to obtain encrypted or signed to-be-uploaded data, and so on. After the data upload request of the user is acquired, the terminal device (that is, the first terminal device) may start the trusted application (that is, the first trusted application) configured to perform data upload processing. The first trusted application may be pre-configured with a security interface. Correspondingly, the TEE of the terminal device may also be provided with a corresponding security interface. Through the security interface between the first trusted application and the TEE, a secure data transmission channel may be established between the first trusted application and the TEE. The first trusted application may extract the to-be-uploaded data from the data upload request, and may transfer the to-be-uploaded data to the TEE of the terminal device through the security interface and the data transmission channel. The setting of the first trusted application, the security interface, the data transmission channel, and the like may ensure the security of the data in the transmission process.

In some embodiments, there may be a variety of first trusted applications. A corresponding first trusted application may be set according to a service type, a service identifier, or the like corresponding to the to-be-uploaded data, a corresponding first trusted application may be set according to data content, a data type, or the like corresponding to the to-be-uploaded data, or a corresponding first trusted application may be set according to different users corresponding to the to-be-uploaded data. Based on the above cases, in addition to the to-be-uploaded data, the data upload request may also include, for example, a service type, a service identifier, a data type, relevant information of a user, and the like. In some embodiments, how to set the first trusted application may be set according to an actual situation, which is not limited in the embodiment of the present specification.

In step S106, it is determined, by using the trusted execution environment of the TEE, whether the to-be-uploaded data complies with the verification rule.

In an embodiment, in order to ensure that the to-be-uploaded data is not leaked during processing, data verification may be performed on the to-be-uploaded data in the trusted execution environment of the TEE. There may be a variety of specific data verification processes. The following provides example processing manners, which may include: presetting a verification rule for performing data verification on the to-be-uploaded data, and after the to-be-uploaded data is transferred to the TEE of the terminal device, placing the to-be-uploaded data in the trusted execution environment of the TEE. In the trusted execution environment of the TEE, the terminal device may analyze the to-be-uploaded data, for example, may determine a service category corresponding to the to-be-uploaded data, or determine relevant information of an organization or institution corresponding to the to-be-uploaded data, and then may acquire a corresponding verification rule based on the determined service category or the determined relevant information of the organization or institution. In the trusted execution environment of the TEE, data verification may be performed on the to-be-uploaded data by using the acquired verification rule. The data verification on the to-be-uploaded data may be performed in many manners. For example, an encrypted label may be set in the to-be-uploaded data in advance. A check value (such as a hash value) of the to-be-uploaded data may be pre-recorded in the label. In addition, the to-be-uploaded data may be data acquired by encrypting the whole original data corresponding to the to-be-uploaded data or by encrypting part of the original data. In this way, in the trusted execution environment of the TEE, the label set in the to-be-uploaded data may be decrypted based on the acquired verification rule to obtain original content of the label, and the original data corresponding to the to-be-uploaded data may be decrypted to obtain the original data corresponding to the to-be-uploaded data. Then, a check value (such as a hash value) corresponding to the original data may be calculated, and the calculated check value may be compared with the check value recorded in the label. Since the above processing is executed in the trusted execution environment of the TEE, it is known by other execution environments of the terminal device or any application program in the terminal device. Therefore, the decrypted to-be-uploaded data and the decrypted label in the executable environment of the TEE may not be acquired by any software program or hardware device other than the trusted execution environment of the TEE, thus ensuring the accuracy and security of the to-be-uploaded data and the label (which may neither be tampered with nor be leaked). Based on this, if the two check values are the same, the verification result may be determined as that the to-be-uploaded data is trusted, that is, it may be determined that the to-be-uploaded data has not been tampered with. If the two check values are different, the verification result may be determined as that the to-be-uploaded data is untrusted. In addition, if the to-be-uploaded data does not include the encrypted label, the verification result may also be determined as that the to-be-uploaded data is untrusted. In addition, validity of the label may also be set in the label (in this case, it is also necessary to validate whether the label is within a set validity period or the like before the verification result of the to-be-uploaded data is determined), which may be set according to an actual situation. In some embodiments, the verification method for the to-be-uploaded data not only includes the above methods, but also may include other various methods.

The above processing of data verification on the to-be-uploaded data is only one example processing method. In some embodiments, data verification may be performed on the to-be-uploaded data by using other processing methods. Data verification may be performed on the to-be-uploaded data by using different processing methods according to different verification rules. Moreover, specific processing processes of data verification on the to-be-uploaded data may be different according to the different verification rules, which may be set according to an actual situation and is not limited in the embodiment of the present specification.

In step S108, if it is determined that the to-be-uploaded data complies with the verification rule, verified to-be-uploaded data is acquired from the TEE based on the first trusted application, and the verified to-be-uploaded data is uploaded.

In an embodiment, a corresponding verification result may be obtained by performing data verification on the to-be-uploaded data in the trusted execution environment of the TEE. The verification result may include the to-be-uploaded data being trusted and the to-be-uploaded data being untrusted. If the verification result acquired through the above processing is the to-be-uploaded data being untrusted, a notification message indicative of failure of the data upload request may be sent to the user initiating the data upload request. In order to enable the user initiating the data upload request to understand a reason for the failure of the data upload request so as to facilitate the user to continue to upload the to-be-uploaded data subsequently, relevant information or code of the failure of the data upload request may be set in the notification message. After viewing the relevant information or code, the user can find and solve a related problem, so that the to-be-uploaded data can be continuously uploaded to the blockchain subsequently. If the verification result acquired through the above processing is the to-be-uploaded data being trusted, a first trusted application may be triggered, so that the first trusted application acquires verified to-be-uploaded data from the TEE and the verified to-be-uploaded data may be uploaded to the blockchain. In this way, the processes of acquiring data to be verified, performing data verification on the data to be verified, and uploading the verified to-be-uploaded data are all completed in a trusted execution environment or a trusted application, which not only can realize the data verification on the data before uploading, but also can ensure the security of the to-be-uploaded data in the process of uploading the data to the blockchain.

Embodiments of the present specification provide a blockchain-based data processing method, which is applied to a terminal device provided with a trusted execution environment TEE. Before to-be-uploaded data is uploaded to a blockchain, the to-be-uploaded data may be transferred, through a first trusted application for performing data upload processing on the terminal device, to the TEE of the terminal device, so as to ensure the security during the transmission of the to-be-uploaded data to the TEE. Moreover, a verification rule set in the trusted execution environment of the TEE is used, and data verification is performed on the to-be-uploaded data in the trusted execution environment of the TEE, so as to ensure the security during processing of the to-be-uploaded data in the terminal device and prevent the to-be-uploaded data from being tampered with, for the TEE is a safe operation environment for data processing. In addition, when it is determined, by using the trusted execution environment of the TEE, whether the to-be-uploaded data complies with the verification rule, verified to-be-uploaded data is acquired from the TEE based on the first trusted application, and the verified to-be-uploaded data is uploaded. In this way, outputting the verified to-be-uploaded data from the trusted execution environment TEE and uploading the verified to-be-uploaded data to the blockchain are both completed by the first trusted application, so that the security in the processes of outputting the to-be-uploaded data from the TEE of the terminal device and outputting the to-be-uploaded data from the terminal device can be guaranteed, and the verified to-be-uploaded data can be prevented from being tampered with or leaked, thereby improving the security of the to-be-uploaded data in the process of being uploaded to the blockchain.

Figure 3:
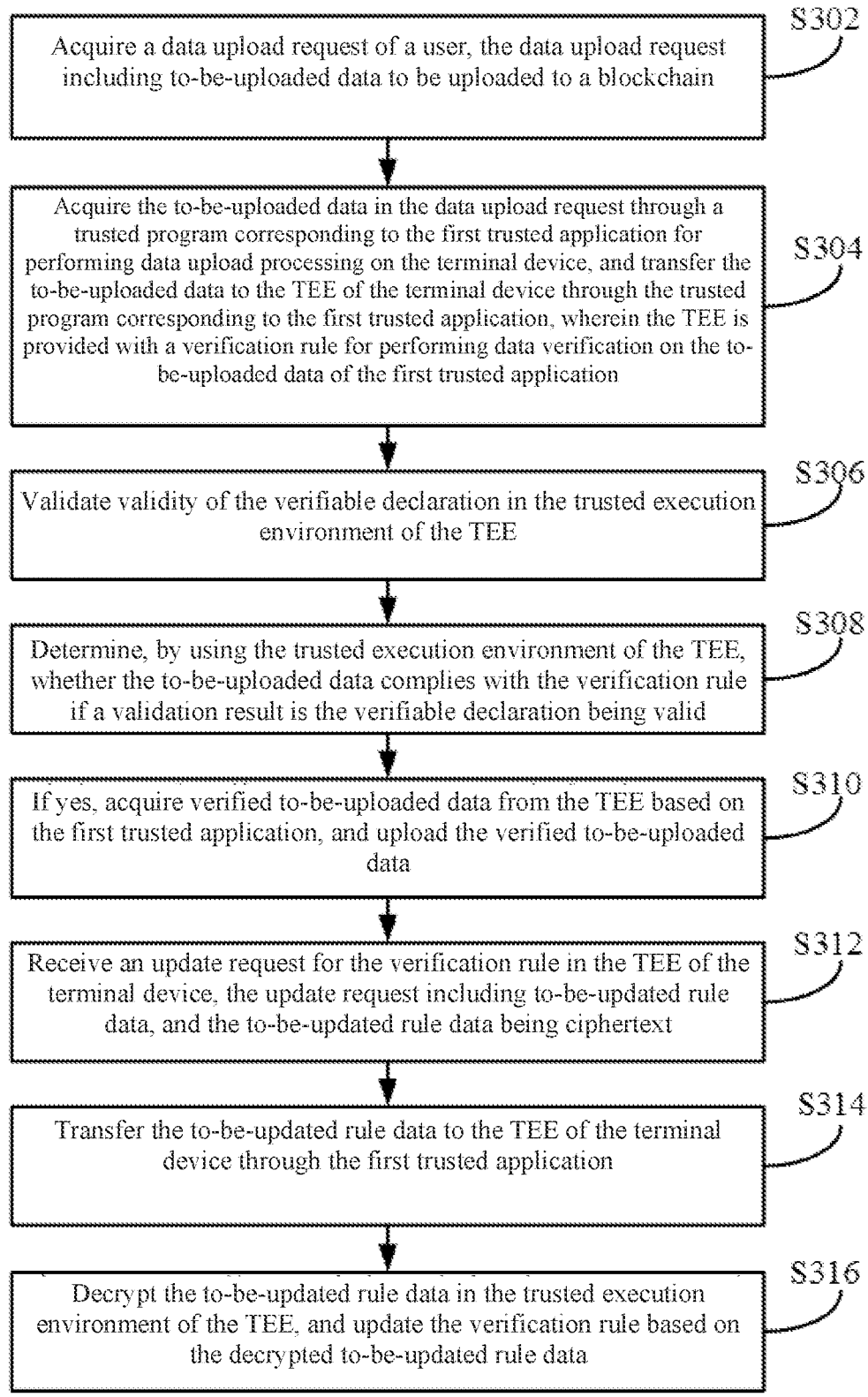
FIG. 3 is a flowchart of a blockchain-based data processing method according to an embodiment.

FIG. 3 is a flowchart of a blockchain-based data processing method according to an embodiment. The method may be performed by a terminal device. The terminal device may be a computer device such as a notebook computer or a desktop computer. The terminal device may be a terminal device configured to verify credibility of the to-be-uploaded data to a blockchain. The terminal device is provided with a trusted execution environment. The trusted execution environment may be a TEE. The trusted execution environment TEE may be implemented by a program written in a predetermined programming language (that is, it may be implemented in the form of software), and the trusted execution environment TEE may be a safe operation environment for data processing. The method may include the following steps:

In step S302, a data upload request of a user is acquired, the data upload request including to-be-uploaded data to be uploaded to a blockchain.

The data upload request may further include a verifiable declaration of the to-be-uploaded data. The verifiable declaration may be a type of normative information for describing some attributes that an entity such as an individual or an organization has. The verifiable declaration may realize evidence-based trust. The verifiable declaration can be used to prove to other entities that information about some attributes of a current entity are trusted. The verifiable declaration may include a plurality of different fields and corresponding field values. For example, if a field is a holder of the to-be-uploaded data, the corresponding field value may be organization A, and if a field is a generation time of the to-be-uploaded data, the corresponding field value may be Jan. 1, 2020.

In an embodiment, in order to ensure the security of the to-be-uploaded data uploaded to the blockchain, the data upload request may further include encrypted to-be-uploaded data, that is, the to-be-uploaded data may be ciphertext. In this case, the processing of step S302 described above may also be completed through the following processing.

In an embodiment, a terminal device of a user (that is, a second terminal device) may upload data through an application program for uploading data to the blockchain. A data uploading entry may be provided in the application program. If the user needs to upload data to the blockchain (that is, the to-be-uploaded data), the to-be-uploaded data may be encrypted through a preset encryption algorithm to obtain encrypted to-be-uploaded data. Then, the encrypted to-be-uploaded data, the verifiable declaration of the to-be-uploaded data, and the like may be uploaded through the above data uploading entry. After completion of the uploading, the terminal device of the user (that is, the second terminal device) may acquire the encrypted to-be-uploaded data and the verifiable declaration of the to-be-uploaded data, and may generate a data upload request and send the data upload request to the above first terminal device. The first terminal device may receive the data upload request.

In step S304, the to-be-uploaded data in the data upload request is acquired through a trusted program corresponding to the first trusted application for performing data upload processing on the terminal device, and the to-be-uploaded data is transferred to the TEE of the terminal device through the trusted program corresponding to the first trusted application, wherein the TEE is provided with a verification rule for performing data verification on the to-be-uploaded data of the first trusted application.

The verification rule is set based on one or more of the following: an anti-tampering rule of uploaded data of the blockchain; a service verification rule of data uploaded to the blockchain; a timeliness condition of data uploaded to the blockchain; and an identity verification rule for a user uploading data to the blockchain. The anti-tampering rule of uploaded data of the blockchain may judge whether the uploaded data of the blockchain is tampered with by, for example, judging whether the data to be verified includes specific or specified information. For example, it may be judged whether the uploaded data of the blockchain is tampered with by determining whether the data to be verified includes specified signature information and/or watermark information and whether the specified signature information and/or the watermark information is complete. In addition, the data to be verified may be calculated through a specified algorithm, and then it is judged through a calculation result whether the uploaded data of the blockchain is tampered with. For example, a hash value of the data to be verified may be calculated, and it is further judged through the calculated hash value whether the uploaded data of the blockchain is tampered with, which may also be set according to an actual situation. A service verification rule of data uploaded to the blockchain may, for example, make a verification rule correspond to a service that the blockchain is oriented to, and may set corresponding verification rules based on different services to which the blockchain is oriented. For example, if a service that the blockchain where the to-be-uploaded data needs to be uploaded is oriented to is an electronic transaction service, the verification rule may, for example, verify whether a service type corresponding to the to-be-uploaded data belongs to an electronic transaction type. If it is determined that the service type corresponding to the to-be-uploaded data does not belong to the electronic transaction type (for example, it belongs to an insurance type or a logistics type), the to-be-uploaded data will not be able to be transmitted into the blockchain. In some embodiments, it not only includes one of the above methods, but also may include other methods, which may be set according to an actual situation and is not limited in the embodiment of the present specification. The timeliness condition of data uploaded to the blockchain may be, for example, a timeliness condition set for uploading the to-be-uploaded data. If the to-be-uploaded data is uploaded within the above time limit, the to-be-uploaded data can be uploaded to the blockchain, and otherwise, the to-be-uploaded data may not be uploaded to the blockchain. In some embodiments, a verification rule may be set directly through the timeliness condition of data uploaded to the blockchain, or set by combining the data timeliness condition with other rules (such as the anti-tampering rule, the service verification rule, and the identity verification rule described above), or the like. The identity verification rule for a user uploading data to the blockchain may be a rule based on an identity of a user having a permission to upload data to the blockchain. For example, users having a permission to upload data to the blockchain include only user A and user B. If the to-be-uploaded data is data provided by a user other than the above two users, the to-be-uploaded data may not be uploaded to the blockchain, or the like.

In an embodiment, the verification rule may also be set based on the above items. In some embodiments, the verification rule may also be set in a variety of manners in addition to in the above manner. The verification rule may be flexibly set according to a user requirement, a requirement of a service corresponding to the blockchain, a requirement of a blockchain manager or a blockchain builder, or the like.

The trusted program corresponding to the first trusted application may be an application program built based on a trusted program in the TEE of the terminal device. The TEE also provides a safe execution environment for an authorized security application (or referred to as a trusted program, i.e., TrustApp (TA)), and at the same time, also protects the confidentiality, integrity, and access permission of resources and data of the trusted program. Different trusted programs can be ensured to be isolated from each other by using cryptography, and any trusted program may not arbitrarily read and operate data of other trusted programs. Therefore, in addition to the TEE and the REE being independent of each other in the terminal device, each trusted program in the TEE may also need authorization and run independently of one another. In addition, the integrity of the trusted program needs to be validated before execution to ensure that the trusted program is not tampered with. The trusted program may directly interact with peripherals such as a touch screen, a camera, and a fingerprint sensor, without the need to provide an interface through the REE of the terminal device, thereby ensuring data security. The trusted application may include a client program and a trusted terminal program. The client program may be a trusted program corresponding to the first trusted application. The trusted terminal program may be a corresponding trusted program in the TEE. The trusted program corresponding to the first trusted application may trigger the corresponding trusted program in the TEE to run, so that the trusted program corresponding to the first trusted application and the corresponding trusted program in the TEE can perform safe data transfer between each other.

In an embodiment, in order to ensure the security and accuracy of the to-be-uploaded data, the data upload request may be acquired through a trusted program corresponding to the first trusted application for performing data upload processing on the terminal device, so that the trusted program corresponding to the first trusted application can acquire the to-be-uploaded data from the data upload request, which further ensures the security of the to-be-uploaded data. In addition, the trusted program corresponding to the first trusted application may trigger the corresponding trusted program in the TEE to run and then a safe data transmission channel is established between the trusted program corresponding to the first trusted application and the corresponding trusted program in the TEE. With the established data transmission channel, the trusted program corresponding to the first trusted application may transfer the to-be-uploaded data to the corresponding trusted program in the TEE of the terminal device, so that the to-be-uploaded data safely arrives at the TEE of the terminal device.

In addition, in order to further ensure the security of the to-be-uploaded data, the to-be-uploaded data may also be transferred to the TEE of the terminal device in the form of ciphertext. For example, the to-be-uploaded data in the data upload request is transferred, through the first trusted application for performing data upload processing on the terminal device, to the TEE of the terminal device.

In an embodiment, in order to ensure the security of the to-be-uploaded data in the data transmission process, the to-be-uploaded data may be encrypted. An encryption algorithm used may include a variety of encryption algorithms, such as a symmetric encryption algorithm or an asymmetric encryption algorithm. The first trusted application may use the above symmetric encryption algorithm or asymmetric encryption algorithm to encrypt the to-be-uploaded data to obtain encrypted to-be-uploaded data (in this case, the to-be-uploaded data is ciphertext). Then, the first trusted application may transfer the encrypted to-be-uploaded data to the TEE of the terminal device through the corresponding interface and the data transmission channel, so as to ensure the security of the to-be-uploaded data in the transferring process.

For the situation in step S302 where the data upload request has included the encrypted to-be-uploaded data, the to-be-uploaded data may not need to be encrypted again, or the to-be-uploaded data may be encrypted again, which may be set according to an actual situation.

In step S306, validity of the verifiable declaration is validated in the trusted execution environment of the TEE.

In an embodiment, the first trusted application may also transfer the verifiable declaration in the data upload request to the TEE of the terminal device in addition to transferring the to-be-uploaded data in the data upload request to the TEE of the terminal device. After the TEE of the terminal device includes the to-be-uploaded data and the verifiable declaration described above, the verifiable declaration may be validated first to judge whether the verifiable declaration is valid, and if the verifiable declaration is determined to be valid, corresponding processing is then performed based on the verifiable declaration, so as to further ensure the security of data processing. The verifiable declaration may be validated in a variety of manners. For example, field values included in the verifiable declaration may be acquired and calculated through a predetermined algorithm (for example, hash values of the field values included in the verifiable declaration may be calculated through a hash algorithm, or the like) to obtain a corresponding calculation result. The verifiable declaration may further include a benchmark value of the above calculation result. The obtained calculation result may be compared with the benchmark value in the verifiable declaration. If the two are the same, the validation is passed, that is, the verifiable declaration is valid. If the two are different, the validation fails, that is, the verifiable declaration is invalid.

In addition to the above method, a variety of methods may also be included. In another example, the verifiable declaration may include a check value of the verifiable declaration. After the TEE in the terminal device includes the verifiable declaration, the check value of the verifiable declaration may be determined through a predetermined check algorithm. Then, a calculated check value may be compared with the check value in the verifiable declaration. If the two are the same, the validation is passed, that is, the verifiable declaration is valid. If the two are different, the validation fails, that is, the verifiable declaration is invalid. In some embodiments, the method for validating the validity of the verifiable declaration not only includes the above two methods, but also may include other methods, which may be set according to an actual situation and is not limited in the embodiment of the present specification.

In step S308, it is determined, by using the trusted execution environment of the TEE, whether the to-be-uploaded data complies with the verification rule if a validation result is the verifiable declaration being valid.

In an embodiment, through the processing of step S306, the to-be-uploaded data may be determined to be untrusted data when the validation result is the verifiable declaration being invalid. In this case, a notification message indicative of failure of the data uploading may be sent to the user initiating the data upload request. If the validation result is the verifiable declaration being valid, the to-be-uploaded data may be determined to be trusted data, that is, the to-be-uploaded data is trusted data.

If the validation result is the verifiable declaration being valid, the encrypted to-be-uploaded data may be decrypted in the trusted execution environment of the TEE to obtain decrypted to-be-uploaded data. Then, it may be determined in the trusted execution environment of the TEE whether the decrypted to-be-uploaded data complies with the verification rule.

For example, if the verification rule is set based on the anti-tampering rule of uploaded data of the blockchain, and the anti-tampering rule is determining whether the data to be verified includes specified signature information and/or watermark information, the decrypted to-be-uploaded data may be analyzed to determine whether the decrypted to-be-uploaded data includes specified signature information. If yes, signature verification may be performed on the decrypted to-be-uploaded data, if the signature verification is passed, it may be determined that the to-be-uploaded data complies with the verification rule, and otherwise, it may be determined that the to-be-uploaded data does not comply with the verification rule. Also for example, the decrypted to-be-uploaded data may be analyzed to determine whether the decrypted to-be-uploaded data includes specified watermark information. If the decrypted to-be-uploaded data includes specified watermark information, the watermark information may be extracted from the decrypted to-be-uploaded data, and the extracted watermark information may be determined. If the watermark information is complete, it may be determined that the to-be-uploaded data complies with the verification rule, and otherwise, it may be determined that the to-be-uploaded data does not comply with the verification rule.

In another example, if the verification rule is set based on the service verification rule of data uploaded to the blockchain, and the service verification rule is determining whether a service type corresponding to the verified to-be-uploaded data belongs to an electronic transaction type, corresponding identifiers may be set in the to-be-uploaded data for different service types, and the decrypted to-be-uploaded data may be analyzed to determine a service type included in the decrypted to-be-uploaded data. If the determined service type is the electronic transaction type, it may be determined that the to-be-uploaded data complies with the verification rule, and otherwise, it may be determined that the to-be-uploaded data does not comply with the verification rule.

If the verification rule is set based on the timeliness condition of data uploaded to the blockchain, the decrypted to-be-uploaded data may be analyzed to determine receiving time of the decrypted to-be-uploaded data and a data timeliness condition corresponding to the decrypted to-be-uploaded data. If it is determined through the receiving time and the data timeliness condition described above that the decrypted to-be-uploaded data is valid, it may be determined that the to-be-uploaded data complies with the verification rule, and otherwise, it may be determined that the to-be-uploaded data does not comply with the verification rule.

If the verification rule is set based on the identity verification rule for a user uploading data to the blockchain, relevant information of the user uploading data of the decrypted to-be-uploaded data may be acquired, and it may be determined based on the relevant information of the user whether the user has a permission to upload data to the blockchain. If it is determined that the user has a permission to upload data to the blockchain, it may be determined that the to-be-uploaded data complies with the verification rule, and otherwise, it may be determined that the to-be-uploaded data does not comply with the verification rule.

In addition, various processing methods may be used for determining, by using the trusted execution environment of the TEE, whether the to-be-uploaded data complies with the verification rule. An example processing method may include processing of step A2 to step A6.

In step A2, the to-be-uploaded data is decrypted in the trusted execution environment of the TEE to obtain decrypted to-be-uploaded data.

In step A4, the decrypted to-be-uploaded data is calculated based on a verification algorithm corresponding to the verification rule in the trusted execution environment of the TEE to obtain a corresponding calculation result.

The verification algorithm may be different based on different verification rules. For example, the verification algorithm may be a hash algorithm, or the verification algorithm may also be a data extraction related algorithm, or the like. For example, data of specified content may be split into a plurality of different parts, and then the split data is inserted into the to-be-uploaded data respectively. Then, after the to-be-uploaded data arrives at the TEE, the above split data may be extracted from the to-be-uploaded data respectively through the above verification algorithm, and the extracted split data may be combined. At the same time, extracted to-be-uploaded data may also be obtained. In this case, combined data and the extracted to-be-uploaded data are validated respectively, and the like.

In step A6, in the trusted execution environment of the TEE, the obtained calculation result is matched with a benchmark result in the verification rule, and it is determined, based on a matching result, whether the to-be-uploaded data complies with the verification rule.

In an embodiment, the first trusted application may acquire a benchmark result in advance, and may transmit the benchmark result to the TEE of the terminal device. After the calculation result of the decrypted to-be-uploaded data is obtained, the calculation result may be compared with the benchmark result. If the two are the same, it may be determined that the to-be-uploaded data complies with the verification rule, and otherwise, it may be determined that the to-be-uploaded data does not comply with the verification rule.

Another processing method for determining, by using the trusted execution environment of the TEE, whether the to-be-uploaded data complies with the verification rule may include step B2 and step B4.

In step B2, a verification rule corresponding to a holder of the verifiable declaration is acquired in the trusted execution environment of the TEE if the validation result is the verifiable declaration being valid.

In an embodiment, if the validation result is the verifiable declaration being valid, it indicates that the to-be-uploaded data is data published or provided by the holder of the verifiable declaration. In order to further verify the data uploaded to the blockchain by holders of different verifiable declarations and ensure the security of the data, verification rules may be set for the holders of different verifiable declarations. In an embodiment, the holders of the verifiable declarations may preset the verification rules for the holders to upload data, to prevent other organizations or users from embezzling the verifiable declarations of the holders of the verifiable declarations to upload false data to the blockchain. A verification rule corresponding to a holder of the verifiable declaration may be acquired in the trusted execution environment of the TEE after the verifiable declaration is determined to be valid.

In step B4, it is determined, by using the trusted execution environment of the TEE, whether the to-be-uploaded data complies with the verification rule corresponding to the holder.

For a detailed processing process of step B4, reference may be made to the above related content.

In step S310, if it is determined that the to-be-uploaded data complies with the verification rule, verified to-be-uploaded data is acquired from the TEE based on the first trusted application, and the verified to-be-uploaded data is uploaded.

In order to perform data verification on the to-be-uploaded data more flexibly, the verification rule that has been set in the TEE may also be modified, as described in step S312 to step S316 below.

In step S312, an update request for the verification rule in the TEE of the terminal device is received, the update request including to-be-updated rule data, and the to-be-updated rule data being ciphertext.

In an embodiment, the verification rule may include a variety of different content. A model configured to perform data verification on the to-be-updated data may also be provided in the trusted execution environment of the TEE according to an actual situation, such as a classification model. The model may be obtained through a complex program written in a predetermined programming language, or through a simple algorithm, which is not limited in the embodiment of the present specification. In addition, in order to prevent irrelevant users from updating the verification rule, relevant information of a user having an update permission (such as a user initially setting or creating the verification rule or a pre-specified user) may also be set for the verification rule, that is, only a user having an update permission can update the verification rule. When a verification rule in the TEE needs to be updated, the user may input an identifier of the verification rule needing to be modified and to-be-updated rule data through the first trusted application (or the trusted program corresponding to the first trusted application, or the like) in the terminal device. Upon completion of the input, the terminal device may acquire the identifier of the verification rule needing to be modified and to-be-updated rule data that are input, and may generate an update request, so that the terminal device may acquire an update request for the data verification rule.

In an embodiment, the to-be-updated rule data may be a model or algorithm in the verification rule, or a service type to which the verification rule applies, or the like, which may be set according to an actual situation and is not limited in the embodiment of the present specification.

In step S314, the to-be-updated rule data is transferred to the TEE of the terminal device through the first trusted application.

In step S316, the to-be-updated rule data is decrypted in the trusted execution environment of the TEE, and the verification rule is updated based on the decrypted to-be-updated rule data.

In an embodiment, the terminal device, after acquiring the update request for the verification rule, may acquire an identifier of the verification rule included in the update request, and may find the corresponding verification rule through the identifier. The information of the user having a permission to update the verification rule may be acquired. It is searched for, from the information of the user having an update permission, whether information of a user initiating a current update request is included. If information of a user initiating a current update request is included, it may be determined that the user initiating the current update request has a permission to update the verification rule. In this case, the terminal device may update the verification rule in the trusted execution environment of the TEE based on the above update request to obtain an updated verification rule. If information of a user initiating a current update request is not included, it may be determined that the user initiating the current update request does not have any permission to update the verification rule. In this case, the terminal device may send a notification message indicative of failure of the updating to the user initiating the current update request.

In some embodiments, step S312 to step S316 may be performed after step S302 to step S310. In some embodiments, step S312 to step S316 may also be performed before step S302 to step S310, or performed before step B4, or the like, which is not limited in the embodiment of the present specification.

In the above embodiments, after the updated verification rule is acquired, the updated verification rule may be subsequently used to perform data verification on the to-be-uploaded data, that is, step S302 to step S310 may be subsequently performed. Step B4 may include: in the trusted execution environment of the TEE, performing data verification on the to-be-uploaded data based on the updated verification rule corresponding to the holder of the verifiable declaration. For a detailed processing process, reference may be made to the above related content.

Embodiments of the present specification provide a blockchain-based data processing method, which is applied to a terminal device provided with a trusted execution environment TEE. Before to-be-uploaded data is uploaded to a blockchain, the to-be-uploaded data may be transferred, through a first trusted application for performing data upload processing on the terminal device, to the TEE of the terminal device, so as to ensure the security during the transmission of the to-be-uploaded data to the TEE. Moreover, a verification rule set in the trusted execution environment of the TEE is used, and data verification is performed on the to-be-uploaded data in the trusted execution environment of the TEE, so as to ensure the security during processing of the to-be-uploaded data in the terminal device and prevent the to-be-uploaded data from being tampered with, for the TEE is a safe operation environment for data processing. In addition, when it is determined, by using the trusted execution environment of the TEE, whether the to-be-uploaded data complies with the verification rule, verified to-be-uploaded data is acquired from the TEE based on the first trusted application, and the verified to-be-uploaded data is uploaded. In this way, outputting the verified to-be-uploaded data from the trusted execution environment TEE and uploading the verified to-be-uploaded data to the blockchain are both completed by the first trusted application, so that the security in the processes of outputting the to-be-uploaded data from the TEE of the terminal device and outputting the to-be-uploaded data from the terminal device can be guaranteed, and the verified to-be-uploaded data can be prevented from being tampered with or leaked, thereby improving the security of the to-be-uploaded data in the process of being uploaded to the blockchain.

In addition, data verification is performed on the to-be-uploaded data in combination with the verifiable declaration, so that the security of the data verification is further improved. Moreover, the verification rule in the TEE may also be updated in real time, so that any simple or complex verification process can be performed on the to-be-uploaded data, which improves the scalability and flexibility of the data verification.

Figure 4:
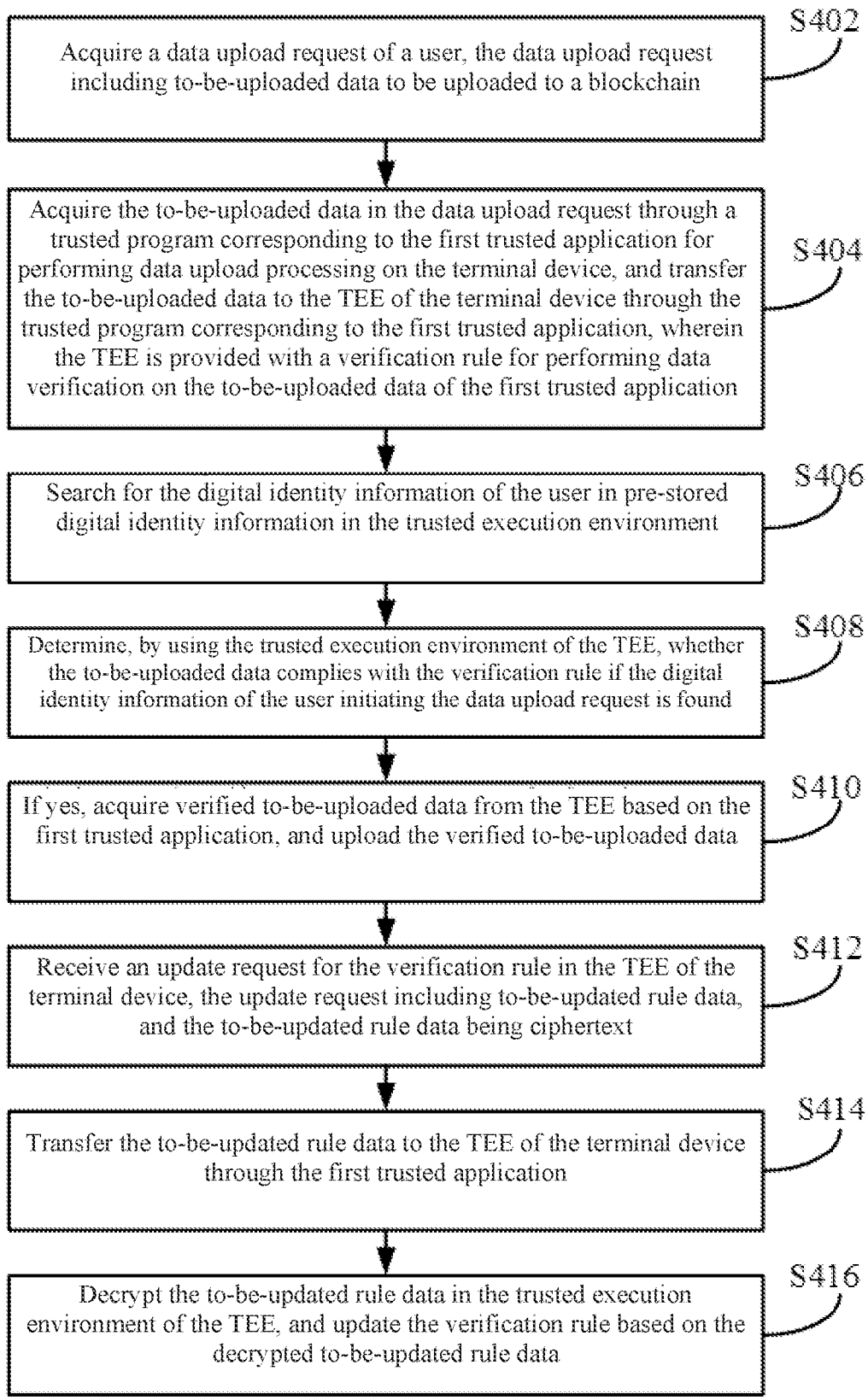
FIG. 4 is a flowchart of a blockchain-based data processing method according to an embodiment.

FIG. 4 is a flowchart of a blockchain-based data processing method according to an embodiment. The method may be performed by a terminal device. The terminal device may be a computer device such as a notebook computer or a desktop computer. The terminal device may be a terminal device configured to verify credibility of the to-be-uploaded data to a blockchain. The terminal device is provided with a trusted execution environment. The trusted execution environment may be a TEE. The trusted execution environment TEE may be implemented by a program written in a predetermined programming language (that is, it may be implemented in the form of software), and the trusted execution environment TEE may be a safe operation environment for data processing. The method may include the following steps:

In step S402, a data upload request of a user is acquired, the data upload request including to-be-uploaded data to be uploaded to a blockchain.

The data upload request may include digital identity information of the user initiating the upload request. The digital identity information may be information that identifiably portrays a user through digital information, that is, real identity information is condensed into a form of digital code, so as to bind, query, and validate personal real-time behavior information of the user. The digital identity information may not only include birth information, individual description, biological characteristics, and other identity coding information of the user, but also involve personal behavior information with a variety of attributes (such as transaction information or entertainment information). The digital identity information may be displayed in a variety of manners, such as Decentralized Identity (DID).

In order to ensure the security of the to-be-uploaded data uploaded, the data upload request may include encrypted to-be-uploaded data. In this case, the to-be-uploaded data may also be pre-processed through the following processing, which may include the following content: decrypting the encrypted to-be-uploaded data in the trusted execution environment of the TEE to obtain decrypted to-be-uploaded data.

In step S404, the to-be-uploaded data in the data upload request is acquired through a trusted program corresponding to the first trusted application for performing data upload processing on the terminal device, and the to-be-uploaded data is transferred to the TEE of the terminal device through the trusted program corresponding to the first trusted application, wherein the TEE is provided with a verification rule for performing data verification on the to-be-uploaded data of the first trusted application.

The verification rule is set based on one or more of the following: an anti-tampering rule of uploaded data of the blockchain; a service verification rule of data uploaded to the blockchain; a timeliness condition of data uploaded to the blockchain; and an identity verification rule for a user uploading data to the blockchain.

In addition, in order to further ensure the security of the to-be-uploaded data, the to-be-uploaded data may also be transferred to the TEE of the terminal device in the form of ciphertext. Details may be acquired with reference to the following content: the to-be-uploaded data in the data upload request is transferred, through the first trusted application for performing data upload processing on the terminal device, to the TEE of the terminal device.

In step S406, the digital identity information of the user is searched for in digital identity information pre-stored in the trusted execution environment.

In an embodiment, corresponding digital identity information may be constructed in the blockchain for different users. For this purpose, digital identity information of the user (such as DID of the user) uploading the data to the blockchain may be preset, and the digital identity information of the user uploading the data to the blockchain may be stored in the TEE or the digital identity information is encrypted and then stored in the terminal device. After acquiring the data upload request, the terminal device may search for, from the TEE, the digital identity information of the user initiating the data upload request in the pre-stored digital identity information. In an embodiment, the encrypted digital identity information may be transferred to the TEE, and the encrypted digital identity information may be decrypted in the trusted execution environment of the TEE to obtain digital identity information, and then it is found, from the digital identity information, whether the digital identity information of the user initiating the data upload request exists.

In step S408, if the digital identity information of the user initiating the data upload request is found, it is determined, by using the trusted execution environment of the TEE, whether the to-be-uploaded data complies with the verification rule.

In addition, there may be a variety of specific processing methods for determining, by using the trusted execution environment of the TEE, whether the to-be-uploaded data complies with the verification rule. An optional processing method is further provided below, which may include: in the trusted execution environment of the TEE, decrypting the to-be-uploaded data to obtain decrypted to-be-uploaded data; in the trusted execution environment of the TEE, calculating the decrypted to-be-uploaded data based on a verification algorithm corresponding to the verification rule to obtain a corresponding calculation result; and in the trusted execution environment of the TEE, matching the obtained calculation result with a benchmark result in the verification rule, and determining, based on a matching result, whether the to-be-uploaded data complies with the verification rule.

For a detailed processing process of step S408, reference may be made to the above related content.

In step S410, if it is determined that the to-be-uploaded data complies with the verification rule, verified to-be-uploaded data is acquired from the TEE based on the first trusted application, and the verified to-be-uploaded data is uploaded.

In order to perform data verification on the to-be-uploaded data more flexibly, the verification rule that has been set in the TEE may also be modified, as described in step S412 to step S416 below.

In step S412, an update request for the verification rule in the TEE of the terminal device is received, the update request including to-be-updated rule data, and the to-be-updated rule data being ciphertext.

In step S414, the to-be-updated rule data is transferred to the TEE of the terminal device through the first trusted application.

In step S416, the to-be-updated rule data is decrypted in the trusted execution environment of the TEE, and the verification rule is updated based on the decrypted to-be-updated rule data.

In some embodiments, step S412 to step S416 may be performed after step S402 to step S410. In some embodiments, step S412 to step S416 may also be performed before step S402 to step S410, which is not limited in the embodiments of the present specification.

For a detailed processing processes of step S412 to step S416, reference may be made to the above related content.

Embodiments of the present specification provide a blockchain-based data processing method, which is applied to a terminal device provided with a trusted execution environment TEE. Before to-be-uploaded data is uploaded to a blockchain, the to-be-uploaded data may be transferred, through a first trusted application for performing data upload processing on the terminal device, to the TEE of the terminal device, so as to ensure the security during the transmission of the to-be-uploaded data to the TEE. Moreover, a verification rule set in the trusted execution environment of the TEE is used, and data verification is performed on the to-be-uploaded data in the trusted execution environment of the TEE, so as to ensure the security during processing of the to-be-uploaded data in the terminal device and prevent the to-be-uploaded data from being tampered with, for the TEE is a safe operation environment for data processing. In addition, when it is determined, by using the trusted execution environment of the TEE, whether the to-be-uploaded data complies with the verification rule, verified to-be-uploaded data is acquired from the TEE based on the first trusted application, and the verified to-be-uploaded data is uploaded. In this way, outputting the verified to-be-uploaded data from the trusted execution environment TEE and uploading the verified to-be-uploaded data to the blockchain are both completed by the first trusted application, so that the security in the processes of outputting the to-be-uploaded data from the TEE of the terminal device and outputting the to-be-uploaded data from the terminal device can be guaranteed, and the verified to-be-uploaded data can be prevented from being tampered with or leaked, thereby improving the security of the to-be-uploaded data in the process of being uploaded to the blockchain.

In addition, data verification is performed on the to-be-uploaded data in combination with the digital identity information (such as DID), so that the security of the data verification is further improved. Moreover, the verification rule in the TEE may also be updated in real time, so that any simple or complex verification process can be performed on the to-be-uploaded data, which improves the scalability and flexibility of the data verification.

Corresponding to the above blockchain-based data processing method, the present specification further provides a blockchain-based data processing apparatus. For example, the apparatus is provided with a trusted execution environment TEE. The trusted execution environment TEE may be a safe operation environment for data processing.

Figure 5:
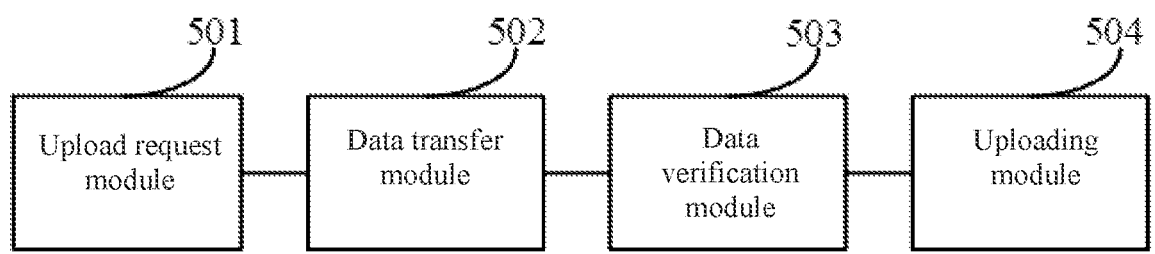
FIG. 5 is a schematic diagram of a blockchain-based data processing apparatus according to an embodiment.

FIG. 5 is a schematic diagram of a blockchain-based data processing apparatus according to an embodiment. For example, the apparatus includes: an upload request module 501, a data transfer module 502, a data verification module 503, and an uploading module 504.

The upload request module 501 is configured to acquire a data upload request of a user, the data upload request including to-be-uploaded data to be uploaded to a blockchain.

The data transfer module 502 is configured to transfer, through a first trusted application for performing data upload processing on the apparatus, the to-be-uploaded data in the data upload request to the TEE of the apparatus, wherein the TEE is provided with a verification rule for performing data verification on the to-be-uploaded data of the first trusted application.

The data verification module 503 is configured to determine, by using the trusted execution environment of the TEE, whether the to-be-uploaded data complies with the verification rule.

The uploading module 504 is configured to, if it is determined, by using the trusted execution environment of the TEE, that the to-be-uploaded data complies with the verification rule, acquire verified to-be-uploaded data from the TEE based on the first trusted application, and upload the verified to-be-uploaded data.

In an embodiment, the data transfer module 502 is configured to transfer, through the first trusted application for performing data upload processing on the apparatus, the to-be-uploaded data in the data upload request to the TEE of the apparatus in the form of ciphertext.

In an embodiment, the data transfer module 502 is configured to acquire, through a trusted program corresponding to the first trusted application for performing data upload processing on the apparatus, the to-be-uploaded data in the data upload request, and transfer, through the trusted program corresponding to the first trusted application, the to-be-uploaded data to the TEE of the apparatus.

In an embodiment, the apparatus further includes: an update request module configured to receive an update request for the verification rule in the TEE of the apparatus, the update request including to-be-updated rule data, and the to-be-updated rule data being ciphertext; an update data transfer module configured to transfer, through the first trusted application, the to-be-updated rule data to the TEE of the apparatus; and the updating module 504 configured to decrypt the to-be-updated rule data in the trusted execution environment of the TEE, and update the verification rule based on the decrypted to-be-updated rule data.

In an embodiment, the verification rule is set based on one or more of the following:

an anti-tampering rule of uploaded data of the blockchain;

a service verification rule of data uploaded to the blockchain;

a timeliness condition of data uploaded to the blockchain; and an identity verification rule for a user uploading data to the blockchain.

In an embodiment, the data upload request includes a verifiable declaration of the to-be-uploaded data, and the data verification module 503 includes: a validity validation unit configured to validate validity of the verifiable declaration in the trusted execution environment of the TEE; and a first data verification unit configured to determine, by using the trusted execution environment of the TEE, whether the to-be-uploaded data complies with the verification rule if a validation result is the verifiable declaration being valid.

In an embodiment, the first data verification unit is configured to acquire a verification rule corresponding to a holder of the verifiable declaration in the trusted execution environment of the TEE if the validation result is the verifiable declaration being valid; and determine, by using the trusted execution environment of the TEE, whether the to-be-uploaded data complies with the verification rule corresponding to the holder.

In an embodiment, the data upload request includes digital identity information of the user, and the data verification module 503 includes: a search unit configured to search for the digital identity information of the user in digital identity information pre-stored in the trusted execution environment; and a second data verification unit configured to determine, by using the trusted execution environment of the TEE, whether the to-be-uploaded data complies with the verification rule if the digital identity information of the user is found in digital identity information pre-stored in the trusted execution environment.

In an embodiment, the to-be-uploaded data is ciphertext, and the data verification module 503 includes in the trusted execution environment of the TEE: a decryption unit configured to decrypt the to-be-uploaded data to obtain decrypted to-be-uploaded data; a calculation unit configured to calculate the decrypted to-be-uploaded data based on a verification algorithm corresponding to the verification rule to obtain a corresponding calculation result; and a third data verification unit configured to match the obtained calculation result with a benchmark result in the verification rule, and determine, based on a matching result, whether the to-be-uploaded data complies with the verification rule.

Embodiments of the present specification provide a blockchain-based data processing apparatus provided with a trusted execution environment TEE. Before to-be-uploaded data is uploaded to a blockchain, the to-be-uploaded data may be transferred, through a first trusted application for performing data upload processing on the apparatus, to the TEE of the apparatus, so as to ensure the security during the transmission of the to-be-uploaded data to the TEE. Moreover, a verification rule set in the trusted execution environment of the TEE is used, and data verification is performed on the to-be-uploaded data in the trusted execution environment of the TEE, so as to ensure the security during processing of the to-be-uploaded data in the apparatus and prevent the to-be-uploaded data from being tampered with, for the TEE is a safe operation environment for data processing. In addition, when it is determined, by using the trusted execution environment of the TEE, whether the to-be-uploaded data complies with the verification rule, verified to-be-uploaded data is acquired from the TEE based on the first trusted application, and the verified to-be-uploaded data is uploaded. In this way, outputting the verified to-be-uploaded data from the trusted execution environment TEE and uploading the verified to-be-uploaded data to the blockchain are both completed by the first trusted application, so that the security in the processes of outputting the to-be-uploaded data from the TEE of the apparatus and outputting the to-be-uploaded data from the apparatus can be guaranteed, and the verified to-be-uploaded data can be prevented from being tampered with or leaked, thereby improving the security of the to-be-uploaded data in the process of being uploaded to the blockchain.

In addition, data verification is performed on the to-be-uploaded data in combination with the verifiable declaration, the digital identity information (such as DID), and the like respectively, so that the security of the data verification is further improved. Moreover, the verification rule in the TEE may also be updated in real time, so that any simple or complex verification process can be performed on the to-be-uploaded data, which improves the scalability and flexibility of the data verification.

Figure 6:
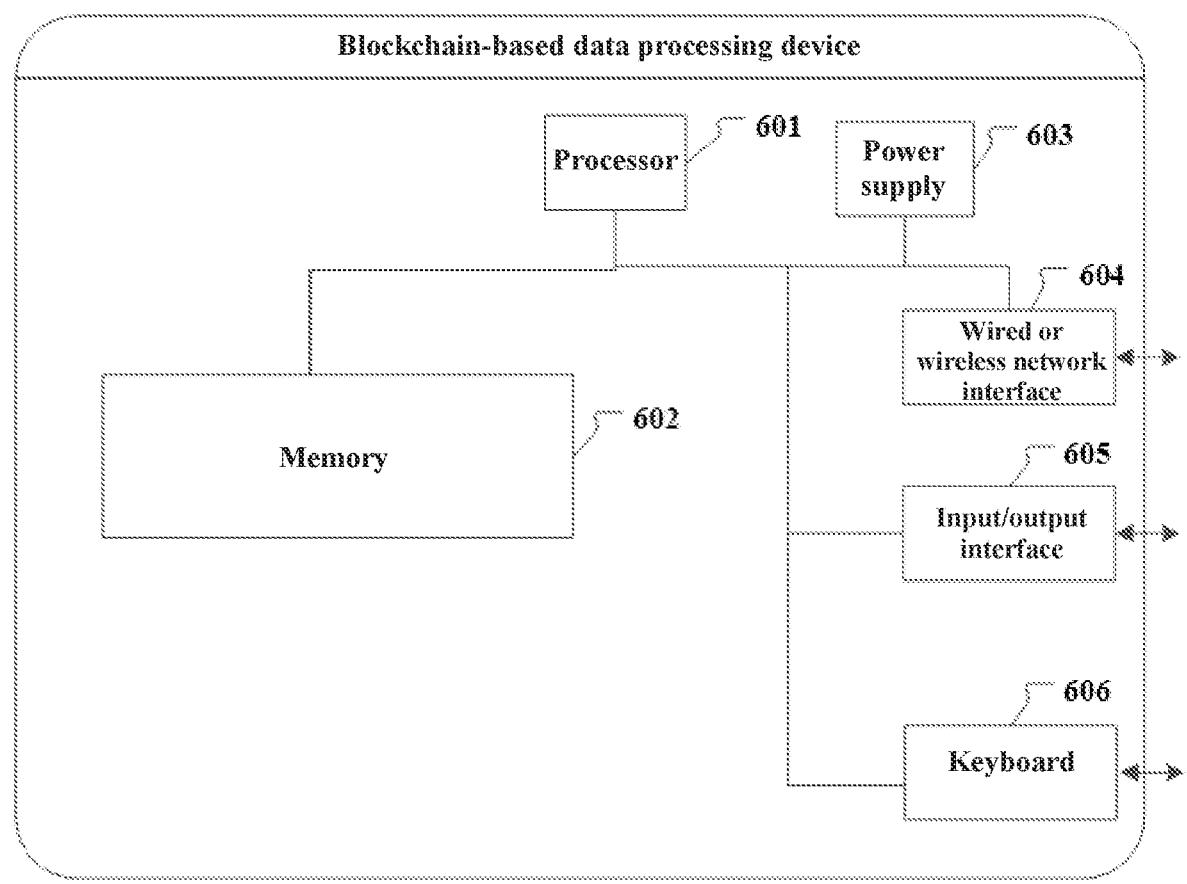
FIG. 6 is a schematic diagram of a blockchain-based data processing device according to an embodiment.

FIG. 6 is a schematic diagram of a blockchain-based data processing device according to an embodiment. The blockchain-based data processing device may be any of the above terminal device or server. The blockchain-based data processing device may be provided with a trusted execution environment TEE. The trusted execution environment TEE may be implemented by a program written in a predetermined programming language (that is, it may be implemented in the form of software), and the trusted execution environment TEE may be a safe operation environment for data processing.

The blockchain-based data processing device may differ greatly depending on different configurations or performance, and may include one or more processors 601 and memory 602. The memory 602 may store one or more storage application programs or data. The memory 602 may be non-transitory storage or persistent storage. The application program(s) stored in the memory 602 may include one or more modules (not shown), and each module may include a series of computer-executable instructions in the blockchain-based data processing device. Furthermore, the processor 601 may be configured to communicate with the memory 602, and execute, on the blockchain-based data processing device, the series of computer-executable instructions in the memory 602. The blockchain-based data processing device may further include one or more power supplies 603, one or more wired or wireless network interfaces 604, one or more input/output interfaces 605, and one or more keyboards 606.

In this embodiment, the blockchain-based data processing device includes a memory and one or more programs. The one or more programs are stored in the memory, and may include one or one modules. Each module may include a series of computer-executable instructions in the blockchain-based data processing device, and is configured to execute, by the one or more processors, the one or more programs for performing the above blockchain-based data processing method including, e.g., acquiring a data upload request of a user, the data upload request including to-be-uploaded data to be uploaded to a blockchain; transferring, through a first trusted application for performing data upload processing on the device, the to-be-uploaded data in the data upload request to the TEE of the device, wherein the TEE is provided with a verification rule for performing data verification on the to-be-uploaded data of the first trusted application; determining, by using the trusted execution environment of the TEE, whether the to-be-uploaded data complies with the verification rule; and if yes, acquiring verified to-be-uploaded data from the TEE based on the first trusted application, and uploading the verified to-be-uploaded data.

In an embodiment, the transferring, through a first trusted application for performing data upload processing on the device, the to-be-uploaded data in the data upload request to the TEE of the device includes: transferring, through the first trusted application for performing data upload processing on the device, the to-be-uploaded data in the data upload request to the TEE of the device in the form of ciphertext.

In an embodiment, the transferring, through a first trusted application for performing data upload processing on the device, the to-be-uploaded data in the data upload request to the TEE of the device includes: acquiring, through a trusted program corresponding to the first trusted application for performing data upload processing on the device, the to-be-uploaded data in the data upload request, and transferring, through the trusted program corresponding to the first trusted application, the to-be-uploaded data to the TEE of the device.

In an embodiment, the device further performs: receiving an update request for the verification rule in the TEE of the device, the update request including to-be-updated rule data, and the to-be-updated rule data being ciphertext; transferring, through the first trusted application, the to-be-updated rule data to the TEE of the device; and decrypting the to-be-updated rule data in the trusted execution environment of the TEE, and updating the verification rule based on the decrypted to-be-updated rule data.

In an embodiment, the verification rule is set based on one or more of the following:

an anti-tampering rule of uploaded data of the blockchain;
a service verification rule of data uploaded to the blockchain;
a timeliness condition of data uploaded to the blockchain; and
an identity verification rule for a user uploading data to the blockchain.

In an embodiment, the data upload request includes a verifiable declaration of the to-be-uploaded data, and the determining, by using the trusted execution environment of the TEE, whether the to-be-uploaded data complies with the verification rule includes: validating validity of the verifiable declaration in the trusted execution environment of the TEE; and determining, by using the trusted execution environment of the TEE, whether the to-be-uploaded data complies with the verification rule if a validation result is the verifiable declaration being valid.

In an embodiment, the determining, by using the trusted execution environment of the TEE, whether the to-be-uploaded data complies with the verification rule if a validation result is the verifiable declaration being valid includes: acquiring a verification rule corresponding to a holder of the verifiable declaration in the trusted execution environment of the TEE if the validation result is the verifiable declaration being valid; and determining, by using the trusted execution environment of the TEE, whether the to-be-uploaded data complies with the verification rule corresponding to the holder.

In an embodiment, the data upload request includes digital identity information of the user, and the determining, by using the trusted execution environment of the TEE, whether the to-be-uploaded data complies with the verification rule includes: searching for the digital identity information of the user in digital identity information pre-stored in the trusted execution environment; and determining, by using the trusted execution environment of the TEE, whether the to-be-uploaded data complies with the verification rule if the digital identity information of the user is found in digital identity information pre-stored in the trusted execution environment.

In an embodiment, the to-be-uploaded data is ciphertext, and the determining, by using the trusted execution environment of the TEE, whether the to-be-uploaded data complies with the verification rule includes: performing, in the trusted execution environment of the TEE, the following processing: decrypting the to-be-uploaded data to obtain decrypted to-be-uploaded data; calculating the decrypted to-be-uploaded data based on a verification algorithm corresponding to the verification rule to obtain a corresponding calculation result; and matching the obtained calculation result with a benchmark result in the verification rule, and determining, based on a matching result, whether the to-be-uploaded data complies with the verification rule.

Embodiments of the present specification provide a blockchain-based data processing device provided with a trusted execution environment TEE. Before to-be-uploaded data is uploaded to a blockchain, the to-be-uploaded data may be transferred, through a first trusted application for performing data upload processing on the device, to the TEE of the device, so as to ensure the security during the transmission of the to-be-uploaded data to the TEE. Moreover, a verification rule set in the trusted execution environment of the TEE is used, and data verification is performed on the to-be-uploaded data in the trusted execution environment of the TEE, so as to ensure the security during processing of the to-be-uploaded data in the device and prevent the to-be-uploaded data from being tampered with, for the TEE is a safe operation environment for data processing. In addition, when it is determined, by using the trusted execution environment of the TEE, whether the to-be-uploaded data complies with the verification rule, verified to-be-uploaded data is acquired from the TEE based on the first trusted application, and the verified to-be-uploaded data is uploaded. In this way, outputting the verified to-be-uploaded data from the trusted execution environment TEE and uploading the verified to-be-uploaded data to the blockchain are both completed by the first trusted application, so that the security in the processes of outputting the to-be-uploaded data from the TEE of the device and outputting the to-be-uploaded data from the device can be guaranteed, and the verified to-be-uploaded data can be prevented from being tampered with or leaked, thereby improving the security of the to-be-uploaded data in the process of being uploaded to the blockchain.

In addition, data verification is performed on the to-be-uploaded data in combination with the verifiable declaration, the digital identity information (such as DID), and the like respectively, so that the security of the data verification is further improved. Moreover, the verification rule in the TEE may also be updated in real time, so that any simple or complex verification process can be performed on the to-be-uploaded data, which improves the scalability and flexibility of the data verification.

The foregoing describes example embodiments of the present specification. Other embodiments may fall within the scope of the appended claims. In some cases, the actions or steps described above may be performed in a different sequence and an expected result may still be achieved. In addition, the processes depicted in the accompanying drawings do not necessarily require specific sequences or consecutive sequences to achieve an expected result. In some implementations, multitasking and parallel processing may be feasible or beneficial.

With the development of technologies, nowadays, the improvement to many method flows can be implemented as a direct improvement to a hardware circuit structure. Designers program improved method flows into hardware circuits to obtain corresponding hardware circuit structures. For example, a Programmable Logic Device (PLD) (e.g., a Field Programmable Gate Array (FPGA)) is such an integrated circuit, and its logic functions are determined by a user through programming the device. Designers "integrate" a digital system onto a piece of PLD by independent programming without asking a chip manufacturer to design and manufacture a dedicated integrated circuit chip. Moreover, at present, instead of manually making an integrated circuit chip, this programming is also implemented mostly using "logic compiler" software, which is similar to a software compiler used for program development and compilation. However, the original code before compilation also has to be compiled using a specific programming language, which is known as a Hardware Description Language (HDL). There is not only one, but many kinds of HDLs, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, and RHDL (Ruby Hardware Description Language). At present, VHDL (Very-High-Speed Integrated Circuit Hardware Description Language) and Verilog are the most commonly used. Those skilled in the art should also know that a hardware circuit for implementing a logic method flow can be easily acquired by slightly logically programming the method flow using the above several hardware description languages and programming it into an integrated circuit.

In some embodiments, a controller may be used to implement the above methods. For example, the controller may be in the form of a microprocessor or processor and a computer-readable medium storing computer-readable program code (such as software or firmware) executable by this (micro)processor, a logic gate, a switch, an Application Specific Integrated Circuit (ASIC), a programmable logic controller, and an embedded microcontroller. Examples of the controller include, but are not limited to, the following microcontrollers: ARC 625D, Atmel AT91SAM, Microchip PIC18F26K20, and Silicone Labs C8051F320. A controller of a memory may also be implemented as part of the control logic of the memory. Those skilled in the art also know that, in addition to implementing a controller in the form of pure computer-readable program code, the method steps can be logically programmed to enable the controller to realize the same function in the form of logic gates, switches, special integrated circuits, programmable logic controllers, embedded microcontrollers, or the like.

The systems, apparatuses, modules, or devices in the above embodiments may be implemented by a computer chip or entity, or by a product with a certain function. A typical implementation device is a computer. For example, the computer may be a personal computer, a laptop computer, a cellular phone, a camera phone, a smart phone, a personal digital assistant, a media player, a navigation device, an email device, a game console, a tablet computer, a wearable device, or a combination of any of these devices.

The embodiments are described with reference to flowcharts and/or block diagrams. It should be understood that each flow and/or block in the flowcharts and/or block diagrams and a combination of flows and/or blocks in the flowcharts and/or block diagrams may be implemented by computer program instructions. These computer program instructions can be provided to a processor of a general-purpose computer, a special-purpose computer, an embedded processor, or another programmable blockchain-based data processing device to produce a machine, so that the instructions executed by the processor of the computer or another programmable blockchain-based data processing device produce an apparatus for realizing the functions specified in one or more flows of the flowcharts and/or one or more blocks of the block diagrams.

These computer program instructions may also be stored in a computer-readable medium that can direct a computer or another programmable blockchain-based data processing device to work in a specific manner, so that the instructions stored in this computer-readable medium produce an article of manufacture including an instruction apparatus which implements the functions specified in one or more flows of the flowcharts and/or one or more blocks of the block diagrams.

These computer program instructions can also be loaded onto a computer or another programmable blockchain-based data processing device, so that a series of operation steps are performed on the computer or another programmable device to produce computer-implemented processing, so that the instructions executed on the computer or another programmable device provide steps for implementing the functions specified in one or more flows of the flowcharts and/or one or more blocks of the block diagrams.

The computer-readable medium includes permanent and non-permanent, removable and non-removable media, which may implement storage of information by using any method or technology. The information may be computer-readable instructions, data structures, modules of programs, or other data. Examples of computer storage media include, but are not limited to, a phase change memory (PRAM), a static random access memory (SRAM), a dynamic random access memory (DRAM), other types of random access memories (RAM), read-only memories (ROM), electrically erasable programmable read-only memories (EEPROM), flash memories or other memory technologies, read-only compact disc read-only memories (CD-ROM), digital versatile disks (DVD) or other optical storage, magnetic tape cassettes, magnetic tape magnetic disk storage or other magnetic storage devices, or any other non-transmission media, and the computer storage media can be used to store information that can be accessed by computing devices. As defined herein, the computer-readable medium does not include transitory computer readable media (transitory media), such as a modulated data signal and a carrier.

One or more embodiments of the present specification may be implemented using computer-executable instructions executed by a computer, such as a program module. Generally, the program module includes a routine, a program, an object, an assembly, a data structure, and the like used for executing a specific task or implementing a specific abstract data type. One or more embodiments of the present specification may also be practiced in distributed computing environments in which tasks are performed by remote processing devices connected through a communication network. In the distributed computing environments, the program module may be located in local and remote computer storage media including a storage device.

The foregoing descriptions are merely example embodiments of the present specification and are not intended to limit the present specification. For those skilled in the art, the present specification may have various alterations and changes. Any modification, equivalent replacement, improvement, and the like made within the spirit and principle of the present specification shall be included in the scope of the claims.

The invention claimed is:

1. A blockchain-based data processing method, applied to a terminal device provided with a trusted execution environment, the method comprising:
   acquiring a data upload request of a user, the data upload request comprising to-be-uploaded data to be uploaded to a blockchain;
   transferring, through a first trusted application for performing data upload processing on the terminal device, the to-be-uploaded data in the data upload request to the trusted execution environment of the terminal device, wherein the trusted execution environment is provided with a verification rule for performing data verification on the to-be-uploaded data of the first trusted application;
   determining, by using the trusted execution environment, whether the to-be-uploaded data complies with the verification rule;
   if it is determined that the to-be-uploaded data complies with the verification rule, acquiring verified to-be-uploaded data from the trusted execution environment based on the first trusted application, and uploading the verified to-be-uploaded data;
   receiving an update request for the verification rule in the trusted execution environment of the terminal device, the update request comprising to-be-updated rule data, and the to-be-updated rule data being ciphertext;

transferring, through the first trusted application, the to-be-updated rule data to the trusted execution environment of the terminal device; and decrypting the to-be-updated rule data in the trusted execution environment, and updating the verification rule based on the decrypted to-be-updated rule data.

2. The method according to claim 1, wherein the transferring, through the first trusted application for performing data upload processing on the terminal device, the to-be-uploaded data in the data upload request to the trusted execution environment of the terminal device comprises:

transferring, through the first trusted application for performing data upload processing on the terminal device, the to-be-uploaded data in the data upload request to the trusted execution environment of the terminal device in a form of ciphertext.

3. The method according to claim 1, wherein the transferring, through the first trusted application for performing data upload processing on the terminal device, the to-be-uploaded data in the data upload request to the trusted execution environment of the terminal device comprises:

acquiring, through a trusted program corresponding to the first trusted application for performing data upload processing on the terminal device, the to-be-uploaded data in the data upload request, and transferring, through the trusted program corresponding to the first trusted application, the to-be-uploaded data to the trusted execution environment of the terminal device.

4. The method according to claim 1, wherein the verification rule is set based on one or more of:

an anti-tampering rule of uploaded data of the blockchain;
a service verification rule of data uploaded to the blockchain;
a timeliness condition of data uploaded to the blockchain; and
an identity verification rule for a user uploading data to the blockchain.

5. The method according to claim 1, wherein the data upload request comprises a verifiable declaration of the to-be-uploaded data, and the determining, by using the trusted execution environment, whether the to-be-uploaded data complies with the verification rule comprises:

validating validity of the verifiable declaration in the trusted execution environment; and
determining, by using the trusted execution environment, whether the to-be-uploaded data complies with the verification rule if a validation result is the verifiable declaration being valid.

6. The method according to claim 5, wherein the determining, by using the trusted execution environment, whether the to-be-uploaded data complies with the verification rule if the validation result is the verifiable declaration being valid comprises:

acquiring a verification rule corresponding to a holder of the verifiable declaration in the trusted execution environment if the validation result is the verifiable declaration being valid; and
determining, by using the trusted execution environment, whether the to-be-uploaded data complies with the verification rule corresponding to the holder.

7. The method according to claim 1, wherein the data upload request comprises digital identity information of the user, and the determining, by using the trusted execution environment, whether the to-be-uploaded data complies with the verification rule comprises:

searching for the digital identity information of the user in digital identity information pre-stored in the trusted execution environment; and
determining, by using the trusted execution environment, whether the to-be-uploaded data complies with the verification rule if the digital identity information of the user is found in digital identity information pre-stored in the trusted execution environment.

8. The method according to claim 1, wherein the to-be-uploaded data is ciphertext, and the determining, by using the trusted execution environment, whether the to-be-uploaded data complies with the verification rule comprises, in the trusted execution environment, performing:

decrypting the to-be-uploaded data to obtain decrypted to-be-uploaded data;
calculating the decrypted to-be-uploaded data based on a verification algorithm corresponding to the verification rule to obtain a corresponding calculation result; and
matching the obtained calculation result with a benchmark result in the verification rule, and determining, based on a matching result, whether the to-be-uploaded data complies with the verification rule.

9. A blockchain-based data processing device, provided with a trusted execution environment, the device comprising:

a processor; and
a memory storing instructions executable by the processor,
wherein the processor is configured to:
acquire a data upload request of a user, the data upload request comprising to-be-uploaded data to be uploaded to a blockchain;
transfer, through a first trusted application for performing data upload processing on the device, the to-be-uploaded data in the data upload request to the trusted execution environment of the device, wherein the trusted execution environment is provided with a verification rule for performing data verification on the to-be-uploaded data of the first trusted application;
determine, by using the trusted execution environment, whether the to-be-uploaded data complies with the verification rule;
if it is determined that the to-be-uploaded data complies with the verification rule, acquire verified to-be-uploaded data from the trusted execution environment based on the first trusted application, and upload the verified to-be-uploaded data;
receive an update request for the verification rule in the trusted execution environment of the device, the update request comprising to-be-updated rule data, and the to-be-updated rule data being ciphertext;
transfer, through the first trusted application, the to-be-updated rule data to the trusted execution environment of the device; and
decrypt the to-be-updated rule data in the trusted execution environment, and update the verification rule based on the decrypted to-be-updated rule data.

10. The device according to claim 9, wherein the processor is further configured to:

transfer, through the first trusted application for performing data upload processing on the device, the to-be-uploaded data in the data upload request to the trusted execution environment of the device in a form of ciphertext.

11. The device according to claim 9, wherein the processor is further configured to:

acquire, through a trusted program corresponding to the first trusted application for performing data upload processing on the device, the to-be-uploaded data in the data upload request, and transfer, through the trusted program corresponding to the first trusted application, the to-be-uploaded data to the trusted execution environment of the device.

12. The device according to claim 9, wherein the verification rule is set based on one or more of:
   an anti-tampering rule of uploaded data of the blockchain;
   a service verification rule of data uploaded to the blockchain;
   a timeliness condition of data uploaded to the blockchain; and
   an identity verification rule for a user uploading data to the blockchain.

13. The device according to claim 9, wherein the data upload request comprises a verifiable declaration of the to-be-uploaded data, and the processor is further configured to:
   validate validity of the verifiable declaration in the trusted execution environment; and
   determine, by using the trusted execution environment, whether the to-be-uploaded data complies with the verification rule if a validation result is the verifiable declaration being valid.

14. The device according to claim 13, wherein the processor is further configured to:
   acquire a verification rule corresponding to a holder of the verifiable declaration in the trusted execution environment if the validation result is the verifiable declaration being valid; and
   determine, by using the trusted execution environment, whether the to-be-uploaded data complies with the verification rule corresponding to the holder.

15. The device according to claim 9, wherein the data upload request comprises digital identity information of the user, and the processor is further configured to:
   search for the digital identity information of the user in digital identity information pre-stored in the trusted execution environment; and
   determine, by using the trusted execution environment, whether the to-be-uploaded data complies with the verification rule if the digital identity information of the user is found in digital identity information pre-stored in the trusted execution environment.

16. The device according to claim 6, wherein the to-be-uploaded data is ciphertext, and wherein the processor is further configured to, in the trusted execution environment, perform:
   decrypting the to-be-uploaded data to obtain decrypted to-be-uploaded data;
   calculating the decrypted to-be-uploaded data based on a verification algorithm corresponding to the verification rule to obtain a corresponding calculation result; and
   matching the obtained calculation result with a benchmark result in the verification rule, and determining, based on a matching result, whether the to-be-uploaded data complies with the verification rule.

17. A non-transitory computer-readable storage medium having stored therein instructions that, when executed by a processor of a terminal device, cause the terminal device to perform a blockchain-based data processing method, the terminal device being provided with a trusted execution environment, the method comprising:
   acquiring a data upload request of a user, the data upload request comprising to-be-uploaded data to be uploaded to a blockchain;
   transferring, through a first trusted application for performing data upload processing on the terminal device, the to-be-uploaded data in the data upload request to the trusted execution environment of the terminal device, wherein the trusted execution environment is provided with a verification rule for performing data verification on the to-be-uploaded data of the first trusted application;
   determining, by using the trusted execution environment, whether the to-be-uploaded data complies with the verification rule;
   if it is determined that the to-be-uploaded data complies with the verification rule, acquiring verified to-be-uploaded data from the trusted execution environment based on the first trusted application, and uploading the verified to-be-uploaded data;
   receiving an update request for the verification rule in the trusted execution environment of the terminal device, the update request comprising to-be-updated rule data, and the to-be-updated rule data being ciphertext;
   transferring, through the first trusted application, the to-be-updated rule data to the trusted execution environment of the terminal device; and
   decrypting the to-be-updated rule data in the trusted execution environment, and updating the verification rule based on the decrypted to-be-updated rule data.

* * * * *